(12) United States Patent
Schmisseur

(10) Patent No.: US 7,188,303 B2
(45) Date of Patent: Mar. 6, 2007

(54) METHOD, SYSTEM, AND PROGRAM FOR GENERATING PARITY DATA

(75) Inventor: Mark A. Schmisseur, Phoenix, AZ (US)

(73) Assignee: Intel Corporation, Santa Clara, CA (US)

( * ) Notice: Subject to any disclaimer, the term of this patent is extended or adjusted under 35 U.S.C. 154(b) by 512 days.

(21) Appl. No.: 10/747,938

(22) Filed: Dec. 29, 2003

(65) Prior Publication Data

US 2005/0160307 A1 Jul. 21, 2005

(51) Int. Cl.
*G06F 11/00* (2006.01)

(52) U.S. Cl. ..................... 714/801; 714/758

(58) Field of Classification Search ........... 714/801, 714/758
See application file for complete search history.

(56) References Cited

U.S. PATENT DOCUMENTS

| | | | | |
|---|---|---|---|---|
| 5,315,602 A * | 5/1994 | Noya et al. | ........... | 714/766 |
| 5,537,567 A * | 7/1996 | Galbraith et al. | ........... | 711/114 |
| 5,636,359 A | 6/1997 | Beardsley et al. | | |
| 5,958,067 A * | 9/1999 | Kaneda et al. | ........... | 714/6 |
| 6,151,641 A | 11/2000 | Herbert | | |
| 6,247,157 B1 * | 6/2001 | Edirisooriya | ........... | 714/6 |
| 6,353,895 B1 | 3/2002 | Stephenson | ........... | 714/5 |
| 6,606,683 B2 * | 8/2003 | Mori | ........... | 711/114 |
| 2005/0050384 A1 * | 3/2005 | Horn | ........... | 714/6 |

FOREIGN PATENT DOCUMENTS

WO  0131456 WO  5/2003

OTHER PUBLICATIONS

Patterson, et al. "A Case for Redundant Arrays of Inexpensive Disks (RAID)," 1988 ACM 0-89791-268-3/88/0006/0109; pp. 109-116.

HP Technical Guide, "Mathematics behind RAID 5DP," Hewlett-Packard Company, 2001; 10 pp.

Intel IOP303 I/O Processor, Internet document http://developer.intel.com/design/iio/80303.htm; copyright 2003, 4 pp. (available prior to Dec. 29, 2003).

Intel IOP331 I/O Processor, Internet document http://developer.intel.com/design/iio/iop331.htm; copyright 2003, 4 pp. (available prior to Dec. 29, 2003).

Intel IOP331I/O Processor Chipset. Internet document http://developer.intel.com/design/iio/docs/iop331.htm; copyright 2003, 1 p. (available prior to Dec. 29, 2003).

Intel 80333 I/O Processor, Developer's Manual. Intel Document No. 305432001US. Copyright Mar. 2005. Copyright & contents (pp. 1-40); Chapters 1 (pp. 41-48) and 6 (pp. 375-408). (subject matter of chapters 1 and 6 available prior to Dec. 29, 2003).

(Continued)

*Primary Examiner*—Albert Decady
*Assistant Examiner*—Mujtaba Chaudry
(74) *Attorney, Agent, or Firm*—William K. Konrad; Konrad Raynes & Victor LLP

(57) ABSTRACT

Provided are a method, system, and program for generating parity data when updating old data stored in an array of storage devices in a data organization type which utilizes parity data. In one embodiment, a logic engine has plural registers or store queues in which new data obtained in a read operation is stored. A logic function such as an Exclusive-OR function is performed on the new data in each of the plural registers using old data obtained in another read operation. A logic function such as an Exclusive-OR function is performed on the intermediate data in one of the plural registers using old parity data of a first type obtained in another read operation, to generate new parity data of the first type. A logic function such as an Exclusive-OR function is performed on the intermediate data in another of the plural registers using old parity data of a second type obtained in another read operation, to generate new parity data of the second type.

20 Claims, 8 Drawing Sheets

OTHER PUBLICATIONS

PCT International Search Report and Written Opinion, May 24, 2006, for International Application No. PCT/US2004/043041 (Foreign counterpart for Ser. No. 10/747,932).

RAID ADVISORY BOARD, The RAIDbook, Sixth Edition, Feb. 1997, "Chapter 10: RAID and Cache", pp. 181-195.

Vilayannur, M., A. Sivasubramaniam, M. Kandemir, R. Thakur, and R. Ross, "Discretionary Caching for I/O on Clusters", Proceedings of the 3rd IEEE/ACM International Symposium on Cluster Computing and the Grid, May 2003, pp. 96-103.

Official Letter, Nov. 21, 2005, for Republic of China Patent Application No. 93139795 (Foreign Counterpart case for U.S. Appl. No. 10/747,932).

* cited by examiner

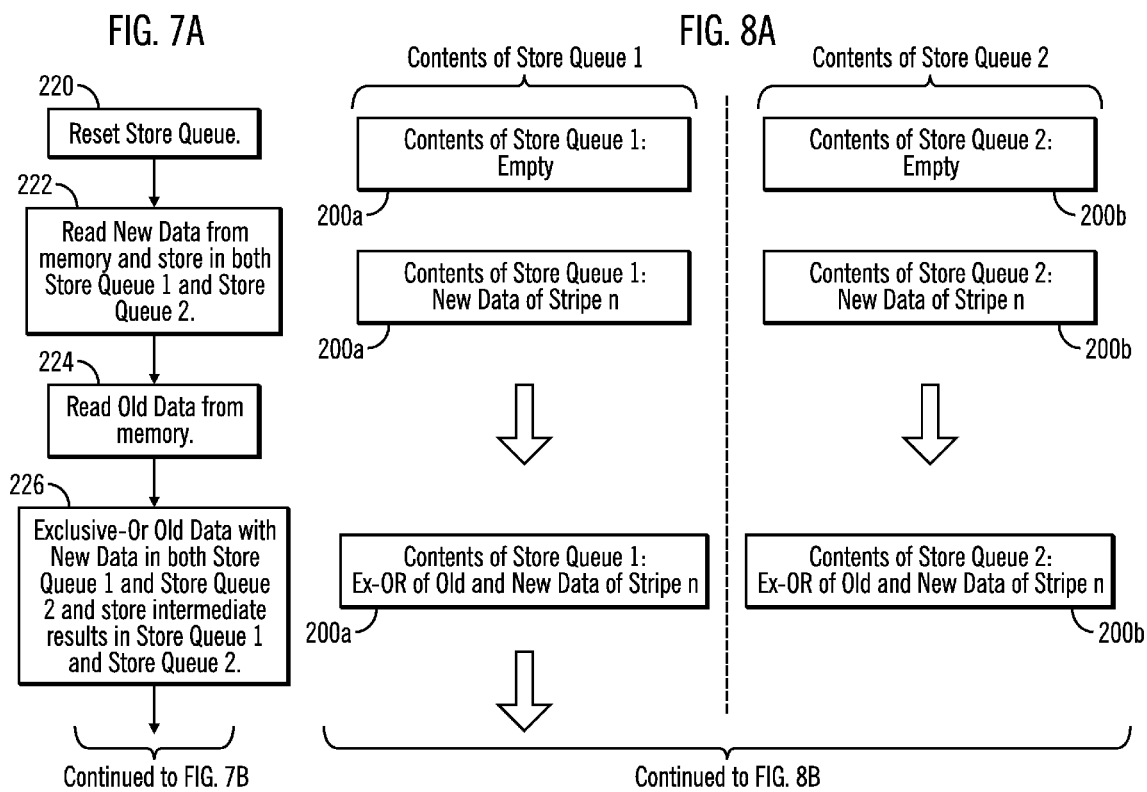

METHOD, SYSTEM, AND PROGRAM FOR GENERATING PARITY DATA

BACKGROUND

1. Field

Embodiments relate to a method, system, and program for generating parity data for a system of organization, such as a RAID system.

2. Description of the Related Art

Various techniques have been proposed for organizing data stored in data storage devices such as disk drives. One such data storage organization is referred to as Redundant Array of Independent (or Inexpensive) Disks or (RAID). In a RAID organization, two or more disk drives are employed in combination to improve fault tolerance or performance, or both. There are different types of RAID data storage organizations and these different types are often referred to as RAID levels 0, 1, 2 . . . .

In a RAID level 0 data organization, for example, the data of a user file is "striped", that is, blocks of user data are spread across multiple disks to improve performance. However, there is generally no redundancy provided for recovery of data should one of the drives fail in a RAID level 0 organization of data. A RAID level 3 organization of data is similar to RAID level 0 but one disk is typically reserved to store error correction data, often referred to as "parity data." This parity data may be used to reconstruct lost user data should one of the drives fail. In a RAID level 5 data organization, parity data is provided for each stripe of data across the array of disk drives and no particular disk drive is dedicated to storing the parity data. Instead, blocks of parity data for the stripes of user data are distributed throughout all the disks of the array, to further improve performance.

In one RAID-5 organization, there is one block of parity data for each stripe of data across the array of disk drives. Such an arrangement provides ready reconstruction of data should one drive fail. Some storage applications can benefit from more robust data protection should more than one drive fail. Additional RAID schemes have been developed which generally have two blocks of parity data for each stripe of data. One known parity scheme includes a "Horizontal" parity block and a "Diagonal" parity block. Terms such as RAID-5DP (dual parity) or RAID-6 have been used in the storage industry for these or similar data organizational arrangements.

FIG. 1 illustrates logical operations which may be performed to generate new parity data when updating old data on a stripe such as stripe n in a RAID system with new data. As shown in FIG. 1, an Exclusive-OR logical function may be performed on the new data 30 and the old data 32 of stripe n. The result of the Exclusive-OR function be Exclusive-OR'ed with the old parity data 34 of stripe n to generate the new parity data 36 for stripe n. The new parity data 36 may be used to overwrite the old parity data 34 on the appropriate RAID storage unit and the new data 30 may be used to overwrite the old data 32 on the appropriate RAID storage unit.

FIG. 2 shows an example of a prior art logic engine 50 of a RAID storage processor for generating a new parity data when writing new data to the RAID storage units in accordance with the logic functions of FIG. 1. The logic engine 50 has a store queue 52 which can perform an Exclusive-OR logical function on the contents of the store queue 52 as represented by an arrow 54 and the data being presented at its input as represented by an arrow 56. The Intel 80303 integrated circuit chip has a similar logic engine referred to as an Application Accelerator Unit (AAU).

The operations of the logic engine 50 of FIG. 2 in generating new parity data is represented in FIG. 3. Upon resetting (block 60) the store queue 52, the new data 30 may be read (block 62) from a local memory 64 (FIG. 2) and stored in the store queue 52. Since the store queue 52 was previously reset, the new data 30 may be stored in the store queue 52 by performing an Exclusive-OR function with the new data 30 read from the local memory 64 and the reset contents of the store queue 52. The size of the read operation will typically depend upon the capacity of the store queue 52. Thus, if, for example, the capacity of the store queue 52 is 1K bytes, the read operation generally continues until the store queue 52 is filled with 1K bytes of new data 30.

The old data 32 which is to be replaced by the new data 30 may also be read (block 64) from the local memory 64 and Exclusive-OR'ed (block 66) with the new data 30 previously stored in the store queue 52, and stored as an intermediate result in the store queue 52. In a third read operation, the old parity data 34 is read (block 68) from the local memory 64 and Exclusive-OR'ed (block 70) with the intermediate result previously stored in the store queue 52. The result of this last Exclusive-OR operation will be the new parity data 36 which may be stored in the store queue 52 for subsequent transfer to the local memory 64 and the stripe n of the storage drives.

Notwithstanding, there is a continued need in the art to improve the performance of processors in data storage organization.

BRIEF DESCRIPTION OF THE DRAWINGS

Referring now to the drawings in which like reference numbers represent corresponding parts throughout:

FIGS. 7A, 7B illustrate one embodiment of operations performed to generate parity data;

FIGS. 8A, 8B illustrate the contents of the store queues of the logic engine of FIG. 6 in one embodiment of operations to generate of parity data.

DETAILED DESCRIPTION OF THE ILLUSTRATED EMBODIMENTS

In the following description, reference is made to the accompanying drawings which form a part hereof and which illustrate several embodiments. It is understood that other embodiments may be utilized and structural and operational changes may be made.

Figures 1, 3:
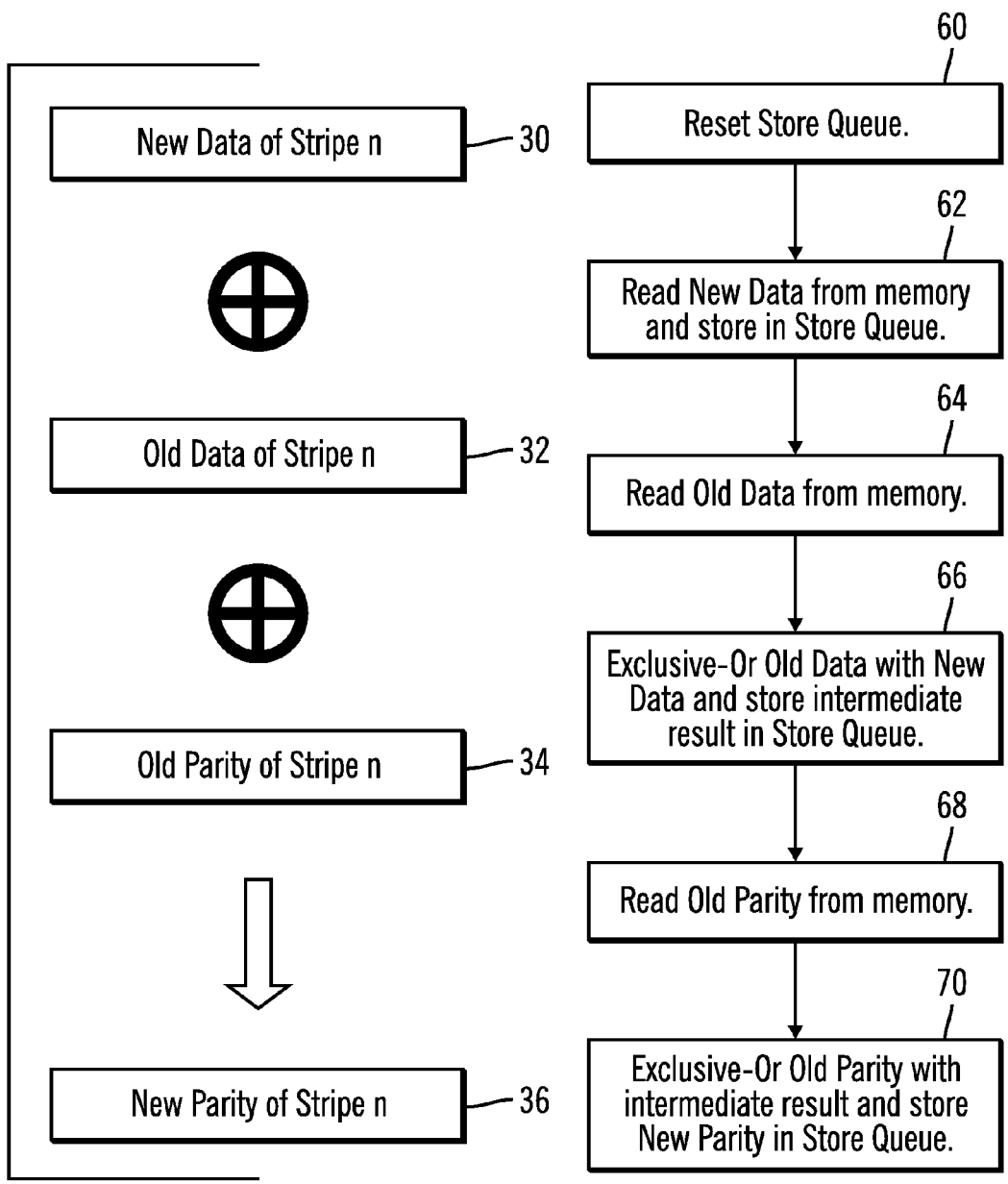
FIG. 1 illustrates a prior art generation of RAID parity data.
FIG. 3 illustrates prior art operations to generate parity data using the prior art logic engine of FIG. 2.
Figure 2:
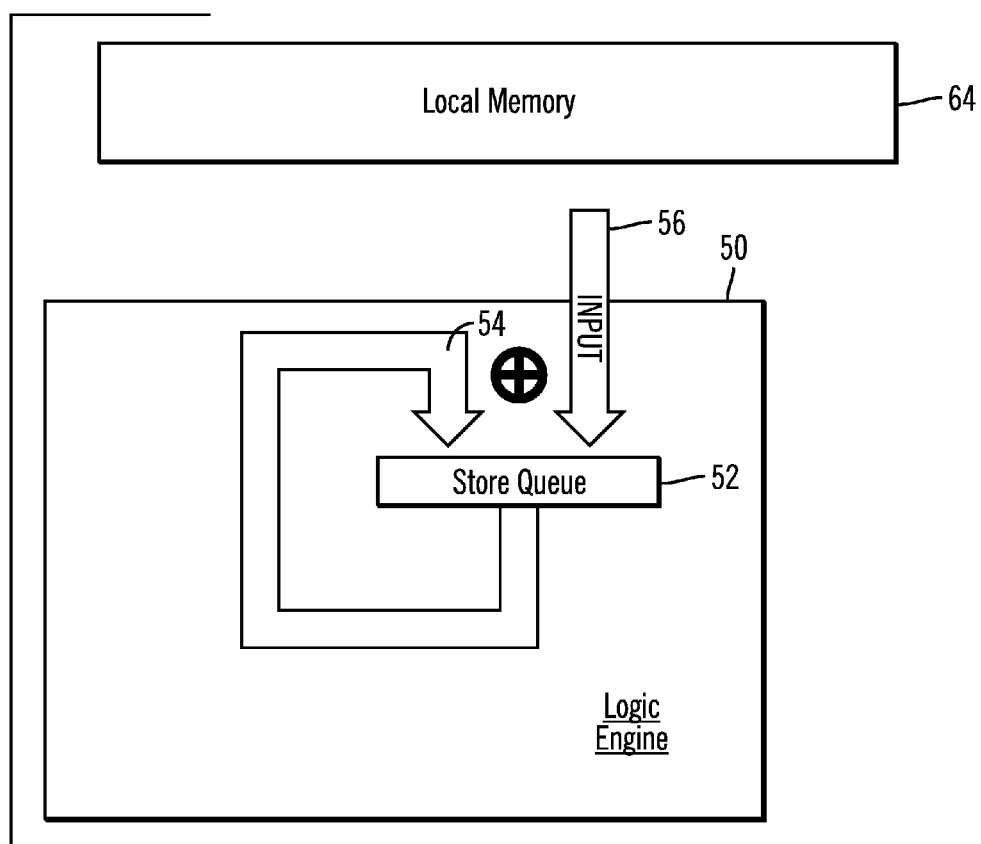
FIG. 2 illustrates a prior art logic engine for generation of RAID parity data.
Figure 4:
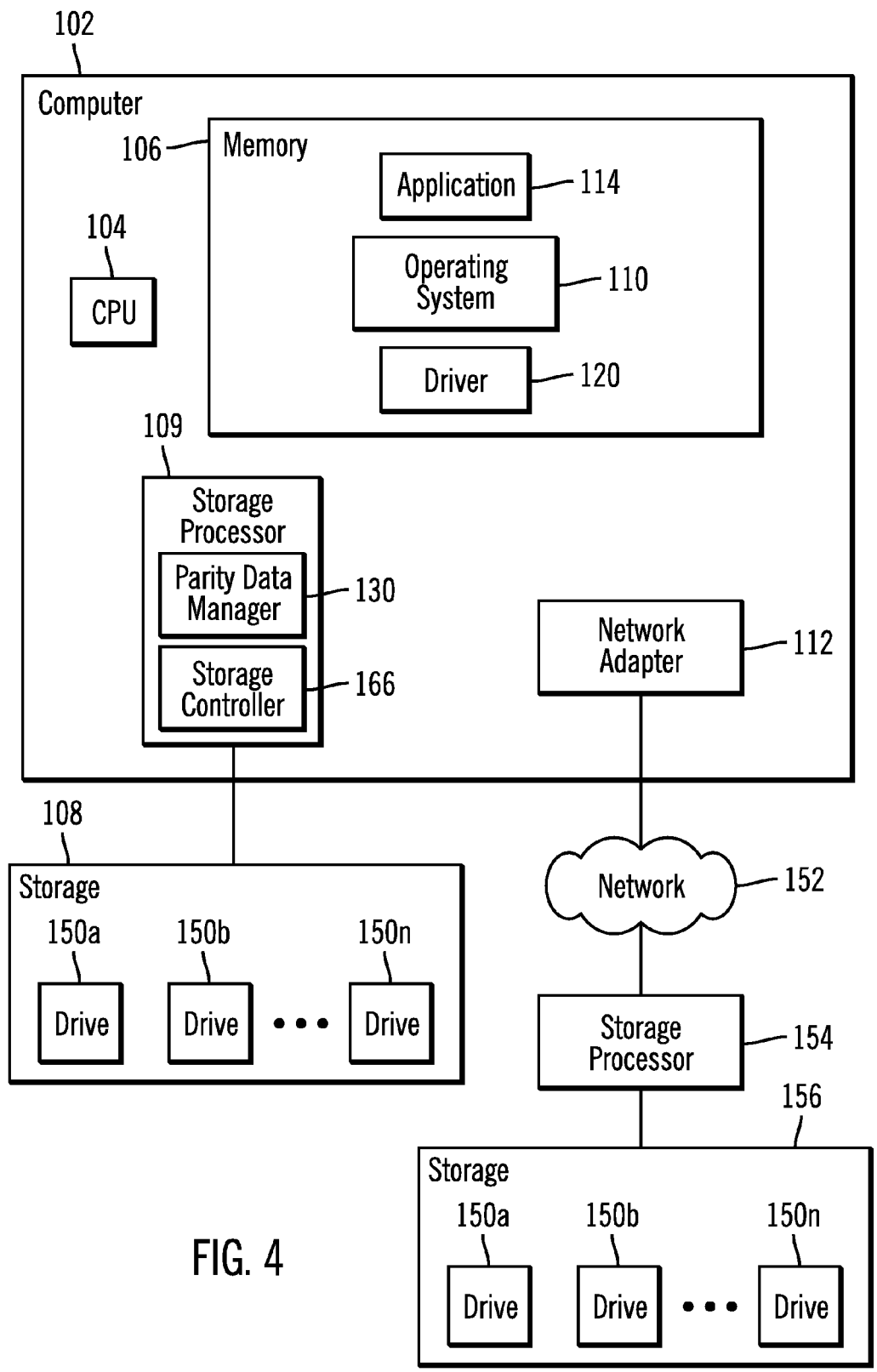
FIG. 4 illustrates one embodiment of a computing environment in which aspects are implemented.

FIG. 4 illustrates a computing environment in which aspects may be implemented. A computer 102 includes one or more central processing units (CPU) 104 (only one is shown), a memory 106, non-volatile storage 108, a storage processor 109, an operating system 110, and a network adapter 112. An application program 114 further executes in memory 106 and is capable of reading data from and writing data to the storage 108. The computer 102 may comprise any computing device known in the art, such as a mainframe, server, personal computer, workstation, laptop, handheld computer, telephony device, network appliance, virtualization device, storage processor, storage controller, etc. Any CPU 104 and operating system 110 known in the art may be used. Programs and data in memory 106 may be swapped into storage 108 as part of memory management operations.

A device driver 120 executes in memory 106 and includes storage processor specific commands to communicate with the storage processor 109 and interface between the operating system 110 and the storage processor 109. For example, the storage 108 may include a plurality of disk drives 150a, 150b . . . 150n, in which the data is initially stored in one or more of the disk drives 150a, 150b . . . 150n in a RAID organization type. This storage processor 109 may be part of the computer 102 or connected to the computer 102 by a network 152 via the network adapter 112 as shown for a storage processor 154 and a storage 156 having another set of disk drives 150a, 150b . . . 150n, for example. For such a network connected storage processor 154, the device driver 120 may include network adapter specific commands to communicate with the network adapter 112 to transfer data to the storage processor 154 for writing on the network storage 156.

In certain implementations, the storage processor 109 performs certain functions to assist the computer 102 in reading data from or writing data to the storage 108. For example, the storage processor 109 includes a parity data manager 130 which manages the generation of parity data during data updates and other data operations. Thus, the data parity manager 130 can be used to update the parity data when updating the user data on the disk drives 150a . . . 150n. The storage processor 109 may have software, firmware or hardware or combinations of these to perform these and other functions.

Figure 5:
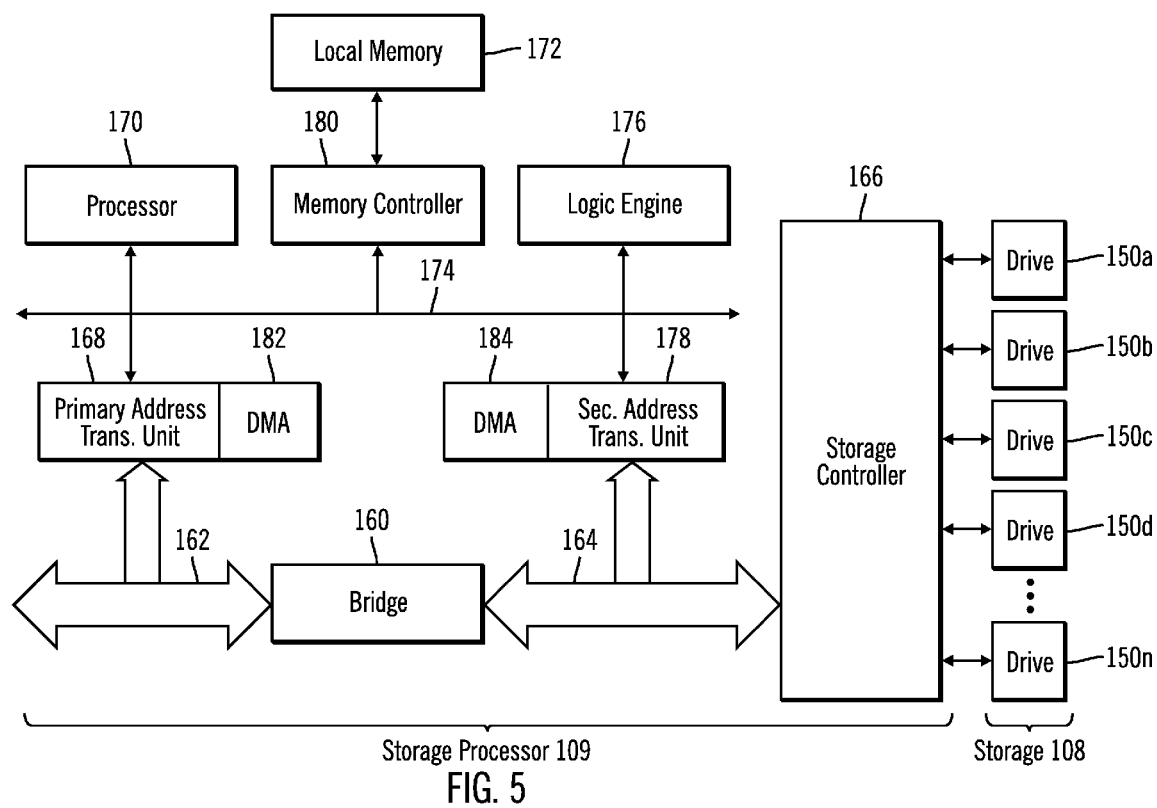
FIG. 5 illustrates one embodiment of a storage processor in accordance with aspects for generation of RAID parity data.

An example of a suitable storage processor 109 is illustrated in FIG. 5. The storage processor 109 facilitates rapid movement of large amounts of data between the host computer 102 and the storage 108. The storage processor 109 includes a bridge 160 between a primary bus 162 of the host computer 102 and a secondary bus 164 coupled to an attachment controller 166 of the storage 108. The bridge 160 permits the attachment controller 166 which may be a Serial-Advanced Technology Attachment (SATA) controller for example, to be physically isolated from the primary bus 162.

A primary address translation unit 168 provides a high throughput data path from the primary bus 162 to a processor 170 and a local memory 172 via a local bus 174. Also coupled to the local bus 174 is a logic engine 176 which provides Exclusive-Or calculations to generate parity blocks for RAID algorithms. A secondary address translation unit 178 provides a high throughput data path from the processor 170 and local memory 172 to the secondary bus 164. In the illustrated embodiment, the busses 162, 164 are PCI busses but other types of peripheral busses may be used as well.

The local memory 172 has a memory controller 180. In the illustrated embodiment, the local memory 172 is volatile, RAM type memory and is used to cache data. Other types of memory may be used as well. Direct Memory Access (DMA) controllers 182, 184 permit direct memory transfers from the host computer 102 to the local memory 172 and from the local memory 172 to the drives 150a . . . 150n.

As previously mentioned, some RAID schemes utilize two blocks of parity data such as a horizontal parity block and a diagonal parity block for each stripe of data. If new data is written to the stripe, both new horizontal parity data and new diagonal parity data could be generated as well. To utilize the logic engine 50 and parity generation operations described above, it is believed that six read operations are utilized, three read operations to generate the horizontal parity data and three read operations to generate the diagonal parity data in the manner described above for the generation of new parity data.

In accordance with one aspect of the illustrated embodiments, a logic engine such as the logic engine 176 of the storage processor 109 can, in some applications, significantly facilitate efficient generation of multiple blocks of parity data. For example, in one application, the number of read operations to generate multiple parity blocks when updating RAID organized data can be significantly reduced.

Figure 6:
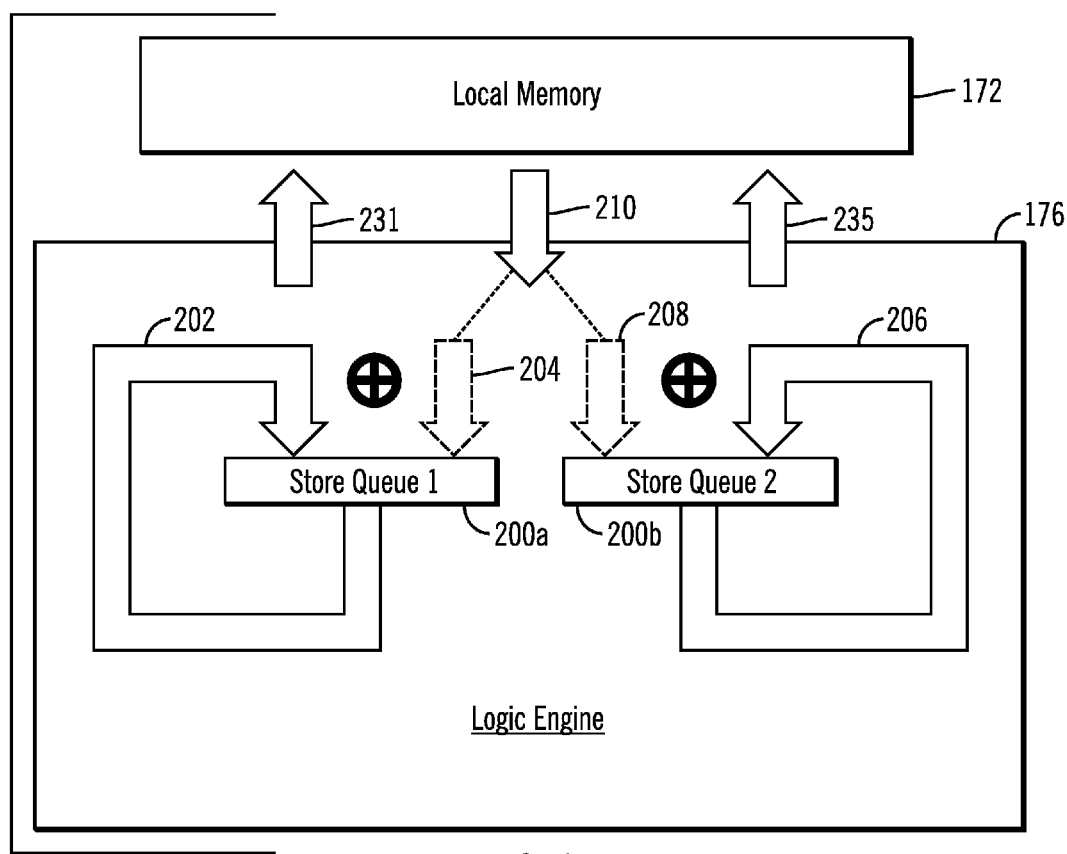
FIG. 6 illustrates one embodiment of a logic engine for the storage processor of FIG. 5 in accordance with aspects for generation of RAID parity data.
Figure 7B:
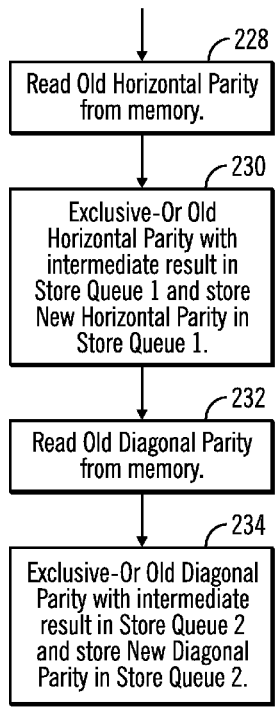

FIG. 6 shows in schematic form, one example of the logic engine 176 which includes a pair of store queues 200a, 200b, also referred to herein as store queue 1, store queue 2, respectively. The store queue 1 can perform an Exclusive-OR logical function on the contents of the store queue 1 as represented by an arrow 202 and the data being presented at its input as represented by an arrow 204. Similarly, the store queue 2 can perform an Exclusive-OR logical function on the contents of the store queue 2 as represented by an arrow 206 and the data being presented at its input as represented by an arrow 208. In accordance with one aspect of the illustrated embodiments, data read in one read operation 210 from a source such as the local memory 172, may be selectively Exclusive-OR'ed with the contents of one or both of the store queues 1, 2 without additional read operations. As will be explained in greater detail below, such an arrangement can facilitate parity data generation.

In the illustrated embodiment, the logic engine 176 is shown comprising store queues. Other types of circuits may be used including registers and other types of memory and logic circuits.

FIGS. 7a, 7b and 8a, 8b illustrate one example of operations of a parity data manager 130 which can include the processor 170 and logic engine 176, to generate dual parity data when updating data stored in the storage 108 with new data. In this example, horizontal and diagonal parity blocks are generated for each stripe to be updated with new data. It is appreciated that other types of multiple parity blocks may be generated as well utilizing the methods and structures herein described.

In this example, the new data to replace the old data in one block of stripe n on the disk drives 150a . . . 150n was previously stored in the local memory 172 by the host computer 102. This data transfer to the local memory 172 from the host computer 102 may, in some embodiments, be a DMA transfer using the DMA controller 1 82. The amount of new data stored in the local memory at a time will depend upon the capacity of the local memory 172. In this embodiment, in addition to the new data, the old data being replaced by the new data is transferred from the storage 108 and stored in the local memory 172. Similarly, the old horizontal parity data to be replaced by the new horizontal parity data to be generated as set forth below, is also transferred from the storage 108 and stored in the local memory 172. Further, the old diagonal parity data to be replaced by the new diagonal parity data to be generated as set forth below, is also transferred from the storage 108 and stored in the local memory 172.

Upon resetting (block 220) both store queue 1 and store queue 2, the contents of the store queue 1 and the store queue 2 are both empty, as indicated in FIG. 8a, opposite block 220 of FIG. 7a. The new data may be read (block 222) from the local memory 172 of the storage processor 109 and stored in both the store queue 1 and the store queue 2, as indicated in FIG. 8a, opposite block 222 of FIG. 7a.

Since the store queue 1 was previously reset, the new data may be stored in the store queue 1 by performing an Exclusive-OR function (FIG. 6) with the new data read from the local memory 172 and the reset contents of the store queue 1. In connection with the storing of the new data in the store queue 1, the same new data may be stored in the store queue 2 by performing an Exclusive-OR function (FIG. 6) with the reset contents of the store queue 2. It is appreciated that the same new data can be stored in both store queues 1, 2 utilizing a single read operation from the local memory 172. The size of the new data read operation from the local memory 172 will typically depend upon the capacity of the store queues 1, 2. Thus, if, for example, the capacity of each of the store queues 1, 2 is 1K bytes, the read operation will continue until each of the store queues 1, 2 is filled with 1K bytes of new data for a block such as block n, of stripe n of the disk drives 150a, 150b . . . 150n.

The old data which is to be replaced by the new data may also be read (block 224) from the local memory 172. The old data may be Exclusive-OR'ed (block 226) with the new data previously stored in the store queue 1, and stored as an intermediate result in the store queue 1 as indicated in FIG. 8a, opposite block 226 of FIG. 7a. In connection with the Exclusive-OR function of the old data with the contents of the store queue 1, the old data may also be Exclusive-OR'ed (block 226) with the new data previously stored in the store queue 2, and stored as an intermediate result in the store queue 2 as indicated in FIG. 8a, opposite block 226 of FIG. 7a. It is appreciated that the same old data can be Exclusive-OR'ed with the contents of both store queues 1, 2 utilizing a single read operation from the local memory 172.

Figure 8B:
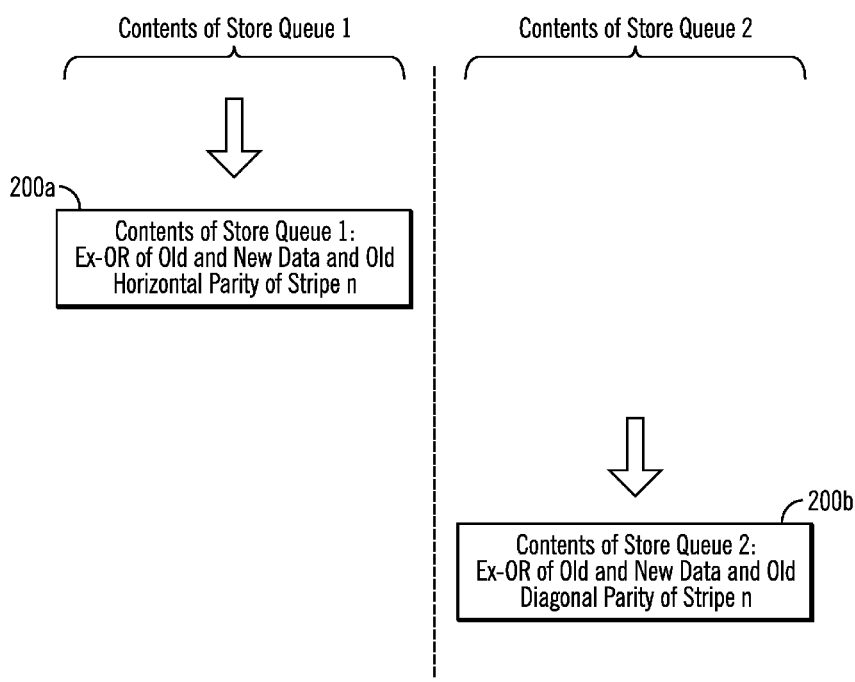

In a third read operation, the old horizontal parity data is read (block 228, FIG. 7b) from the local memory 172 and Exclusive-OR'ed (block 230) with the intermediate result previously stored in the store queue 1. The result of this last Exclusive-OR operation for store queue 1 will be the new horizontal parity data which is stored in the store queue 1, as indicated in FIG. 8b, opposite block 230 of FIG. 7b. The new horizontal parity data may be written from the store queue 1 to the local memory 172 as indicated by the arrow 231 (FIG. 6) for subsequent transfer to the horizontal parity block of stripe n of the storage drives 150a . . . 150n by the storage processor 109.

In a fourth read operation, the old diagonal parity data is read (block 232) from the local memory 172 and Exclusive-OR'ed (block 234) with the intermediate result previously stored in the store queue 2. The result of this last Exclusive-OR operation for store queue 2 will be the new diagonal parity data which is stored in the store queue 2, as indicated in FIG. 8b, opposite block 234 of FIG. 7b. The new diagonal parity data may be written from the store queue 2 to the local memory 172 as indicated by arrow 235 (FIG. 6) for subsequent transfer to the diagonal parity block of stripe n of the storage drives 150a . . . 150n by the storage processor 109.

In connection with the writing of the new horizontal parity data and the new diagonal parity data to the stripe n of disk drives 150a, 150b . . . 150n, the new data may be written to a block of the stripe n as well. The operations of FIGS. 7a, 7b may be repeated until new horizontal and diagonal parity data has been generated for all the new data, and all of the new data and new horizontal parity and diagonal parity data have been written to the associated blocks of the stripe n of the disk drives 150a, 150b . . . 150n.

In the illustrated embodiment, the read operations of new data, old data and old parity have included transfers of data from the local memory 172 to the logic engine 176. It is appreciated that in alternative embodiments, data can be transferred directly from storage such as the storage 108 to a logic engine such as the logic engine 176, as described in application entitled, "METHOD, SYSTEM, AND PROGRAM FOR MANAGING DATA ORGANIZATION" assigned to the assignee of the present application, filed Dec. 29, 2003, and Ser. No. 10/747,932.

ADDITIONAL EMBODIMENT DETAILS

The described techniques for managing parity data generation may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration and that the article of manufacture may comprise any information bearing medium known in the art.

In certain implementations, the storage processor 109 includes a parity data manager 130 which manages the generation of parity data during data updates and other data operations. The storage processor 109 may have software, firmware or hardware or combinations of these to perform these and other functions. For example, in one embodiment, the processor 170 and the logic engine 176 may be implemented in hardware in a storage processor 109 separate from the host processor. In other implementations, the parity data manager may be implemented in host software including drivers, an operating system or an application, or combinations of these.

In certain implementations, a computer system may include a driver and a storage controller, such as Serial-Advanced Technology Attachment (SATA), Serial Attached SCSI (SAS), Redundant Array of Independent Disk (RAID), etc., controller, that manages access to a non-volatile storage device, such as a magnetic disk drive, tape media, optical disk, etc. In alternative implementations, the storage controller embodiments may be included in a system that does not include a driver. Further details on the SAS architecture for devices and expanders is described in the technology specification "Information Technology—Serial Attached SCSI (SAS)", reference no. ISO/IEC 14776-150:200x and ANSI INCITS.***:200x PHY layer (Jul. 9, 2003), published by ANSI. Details on the SATA architecture are described in the technology specification "Serial ATA: High Speed Serialized AT Attachment" Rev. 1.0A (January 2003).

In certain implementations, the device driver and storage processor embodiments may be implemented in a computer system including a video controller to render information to display on a monitor coupled to the computer system including the device driver and network adapter, such as a computer system comprising a desktop, workstation, server, mainframe, laptop, handheld computer, etc. Alternatively, the storage processor and device driver embodiments may be implemented in a computing device that does not include a video controller.

In certain implementations, the logic engine is showed as having two store queues 1, 2 or registers 200*a*, 200*b*. Alternatively, the logic engine could have additional store queues or registers, particularly if more than two types of parity data are to be generated.

In certain implementations, the network adapter may be configured to transmit data across a cable connected to a port on the network adapter. Alternatively, the network adapter embodiments may be configured to transmit data over a wireless network or connection, such as wireless LAN, Bluetooth, etc.

The illustrated logic of FIGS. 7*a*–7*b*, 8*a*, 8*b* shows certain events occurring in a certain order. In alternative embodiments, certain operations may be performed in a different order, modified or removed. Moreover, operations may be added to the above described logic and still conform to the described embodiments. Further, operations described herein may occur sequentially or certain operations may be processed in parallel. Yet further, operations may be performed by a single processing unit or by distributed processing units.

Figure 9:
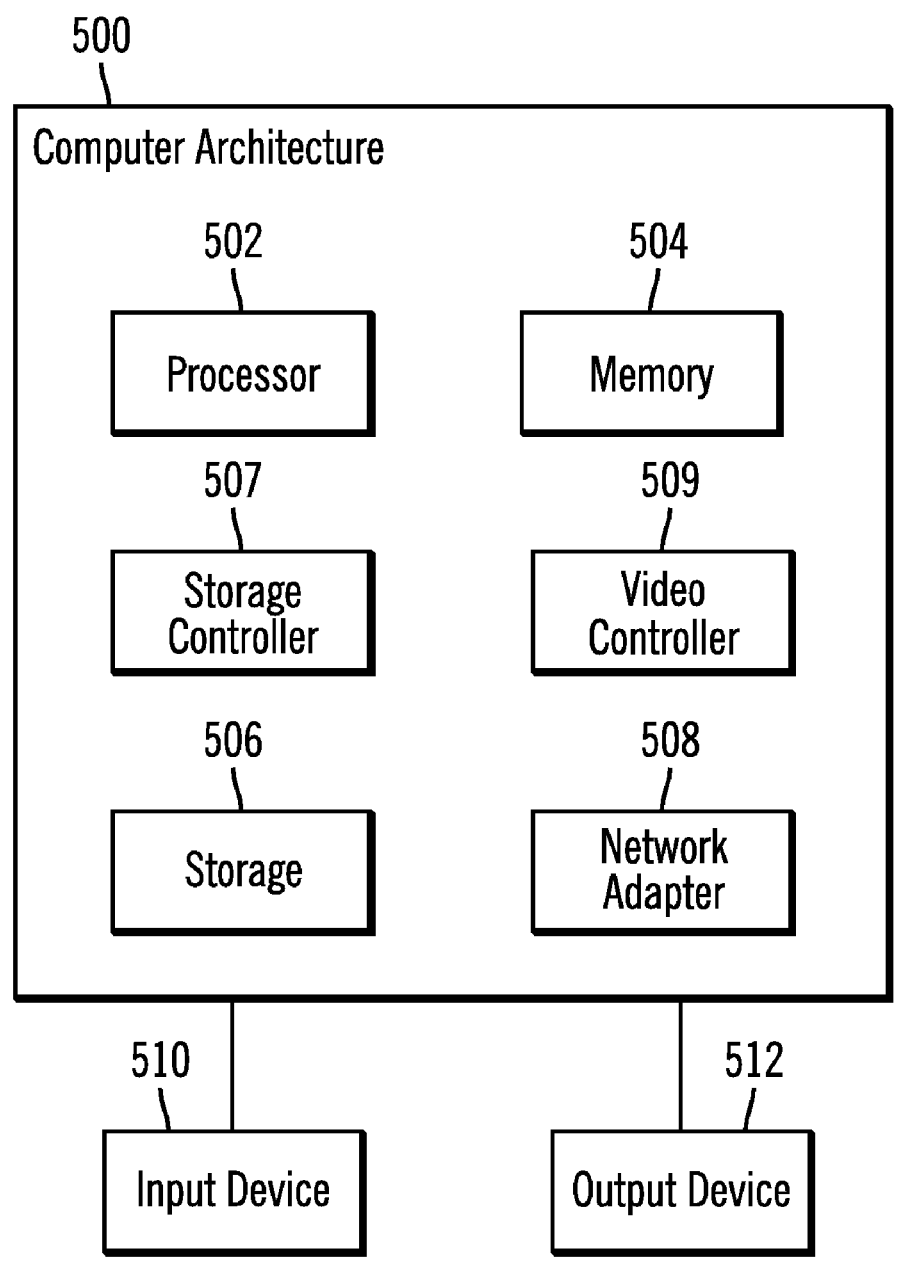
FIG. 9 illustrates an architecture that may be used with the described embodiments.

FIG. 9 illustrates one implementation of a computer architecture 500 of the network components, such as the hosts and storage devices shown in FIG. 4. The architecture 500 may include a processor 502 (e.g., a microprocessor), a memory 504 (e.g., a volatile memory device), and storage 506 (e.g., a non-volatile storage, such as magnetic disk drives, optical disk drives, a tape drive, etc.). The storage 506 may comprise an internal storage device or an attached or network accessible storage. Programs in the storage 506 are loaded into the memory 504 and executed by the processor 502 in a manner known in the art. A storage processor or controller 507 can control the storage 506. The architecture further includes a network adapter 508 to enable communication with a network, such as an Ethernet, a Fibre Channel Arbitrated Loop, etc. Details on the Fibre Channel architecture are described in the technology specification "Fibre Channel Framing and Signaling Interface", document no. ISO/IEC AWI 14165-25.

Further, the architecture may, in certain embodiments, include a video controller 509 to render information on a display monitor, where the video controller 509 may be implemented on a video card or integrated on integrated circuit components mounted on the motherboard. As discussed, certain of the network devices may have multiple storage cards or controllers. An input device 510 is used to provide user input to the processor 502, and may include a keyboard, mouse, pen-stylus, microphone, touch sensitive display screen, or any other activation or input mechanism known in the art. An output device 512 is capable of rendering information transmitted from the processor 502, or other component, such as a display monitor, printer, storage, etc.

The storage controller 506 and the network adapter 508 may each be implemented on cards, such as a Peripheral Component Interconnect (PCI) card or some other I/O card, or on integrated circuit components mounted on the motherboard. Details on the PCI architecture are described in "PCI Local Bus, Rev. 2.3", published by the PCI-SIG.

The foregoing description of various embodiments has been presented for the purposes of illustration and description. The above specification, examples and data provide a complete description of the manufacture and use of the composition of certain embodiments. It is not intended to be exhaustive or to limit to the precise form disclosed. Many modifications and variations are possible in light of the above teaching.

What is claimed is:

1. A method of modifying old data, comprising:

transferring to a logic engine, new data in a first transfer operation, old data in a second transfer operation; old first parity data in a third transfer operation and old second parity data in a fourth transfer operation;

generating in said logic engine a new first parity data using said new data transferred to said logic engine in said first transfer operation, said old data transferred to said logic engine in said second transfer operation, and said old first parity data transferred to said logic engine in said third transfer; and generating in said logic engine a new second parity data using said new data transferred to said logic engine in said first transfer operation, said old data transferred to said logic engine in said second transfer operation, and said old second parity data transferred to said logic engine in said fourth transfer operation.

2. The method of claim 1 wherein said old data, old first parity data and old second parity data are stored in a stripe of data stored across a plurality of storage devices.

3. The method of claim 2 wherein said plurality of storage devices are arranged in a Redundant Array of Independent Disks organization.

4. The method of claim 3 wherein said new first parity data is horizontal parity data.

5. The method of claim 4 wherein said new second parity data is diagonal parity data.

6. The method of claim 1 wherein said generating in said logic engine a new first parity data includes applying said new data transferred to said logic engine in said first transfer operation, to a first store queue of said logic engine and performing an exclusive-OR logic function operation on the contents of said first store queue and said applied new data, and wherein said generating in said logic engine new second parity data includes applying said new data transferred to said logic engine in said first transfer operation, to a second store queue of said logic engine, and performing an exclusive-OR logic function operation on the contents of said second store queue and said applied new data.

7. The method of claim 6 wherein said generating in said logic engine a new first parity data includes applying said old data transferred to said logic engine in said second transfer operation, to said first store queue of said logic engine and performing an exclusive-OR logic function operation on the contents of said first store queue and said applied old data, and wherein said generating in said logic engine new second parity data includes applying said old data transferred to said logic engine in said second transfer operation, to said second store queue of said logic engine, and performing an exclusive-OR logic function operation on the contents of said second store queue and said old data.

8. The method of claim 7 wherein said generating in said logic engine a new first parity data includes applying said old first parity data transferred to said logic engine in said third transfer operation, to said first store queue of said logic engine and performing an exclusive-OR logic function operation on the contents of said first store queue and said applied old first parity data, and wherein said generating in said logic engine new second parity data includes applying said old second parity data transferred to said logic engine in said fourth transfer operation, to said second store queue of said logic engine, and performing an exclusive-OR logic function operation on the contents of said second store queue and said old second parity data.

9. The method of claim 1 wherein old data is transferred to said logic engine from a volatile memory.

10. The method of claim 2 further comprising overwriting said old data in said stripe with said new data, overwriting said old first parity data with said new first parity data and overwriting said old second parity data with said new second parity data.

11. An article comprising a storage medium, the storage medium comprising machine readable instructions stored thereon to:
transfer to a logic engine, new data in a first transfer operation, old data in a second transfer operation; old first parity data in a third transfer operation and old second parity data in a fourth transfer operation;
generate in said logic engine a new first parity data using said new data transferred to said logic engine in said first transfer operation, said old data transferred to said logic engine in said second transfer operation, and said old first parity data transferred to said logic engine in said third transfer; and
generate in said logic engine a new second parity data using said new data transferred to said logic engine in said first transfer operation, said old data transferred to said logic engine in said second transfer operation, and said old second parity data transferred to said logic engine in said fourth transfer operation.

12. The article of claim 11 wherein said old data, old first parity data and old second parity data are stored in a stripe of data stored across a plurality of storage devices.

13. The article of claim 12 wherein said plurality of storage devices are arranged in a Redundant Array of Independent Disks organization.

14. The article of claim 13 wherein said new first parity data is horizontal parity data.

15. The article of claim 14 wherein said new second parity data is diagonal parity data.

16. The article of claim 11 wherein the machine readable instructions to generate in said logic engine a new first parity data include machine readable instructions stored on the storage medium to apply said new data transferred to said logic engine in said first transfer operation, to a first store queue of said logic engine and to perform an exclusive-OR logic function operation on the contents of said first store queue and said applied new data, and wherein the machine readable instructions to generate in said logic engine new second parity data include machine readable instructions stored on the storage medium to apply said new data transferred to said logic engine in said first transfer operation, to a second store queue of said logic engine, and to perform an exclusive-OR logic function operation on the contents of said second store queue and said applied new data.

17. The article of claim 16 wherein the machine readable instructions to generate in said logic engine a new first parity data include machine readable instructions stored on the storage medium to apply said old data transferred to said logic engine in said second transfer operation, to said first store queue of said logic engine and to perform an exclusive-OR logic function operation on the contents of said first store queue and said applied old data, and wherein the machine readable instructions to generate in said logic engine new second parity data include machine readable instructions stored on the storage medium to apply said old data transferred to said logic engine in said second transfer operation, to said second store queue of said logic engine, and to perform an exclusive-OR logic function operation on the contents of said second store queue and said old data.

18. The article of claim 17 wherein the machine readable instructions to generate in said logic engine a new first parity data include machine readable instructions stored on the storage medium to apply said old first parity data transferred to said logic engine in said third transfer operation, to said first store queue of said logic engine and to perform an exclusive-OR logic function operation on the contents of said first store queue and said applied old first parity data, and wherein the machine readable instructions to generate in said logic engine new second parity data include machine readable instructions stored on the storage medium to apply said old second parity data transferred to said logic engine in said fourth transfer operation, to said second store queue of said logic engine, and to perform an exclusive-OR logic function operation on the contents of said second store queue and said old second parity data.

19. The article of claim 11 wherein old data is transferred to said logic engine from a volatile memory.

20. The article of claim 12 wherein the storage medium further comprises machine readable instructions stored thereon to overwrite said old data in said stripe with said new data, overwrite said old first parity data with said new first parity data and overwrite said old second parity data with said new second parity data.

* * * * *